US008416736B2

(12) United States Patent
Ji et al.

(10) Patent No.: US 8,416,736 B2
(45) Date of Patent: Apr. 9, 2013

(54) CANDIDATE SET MANAGEMENT IN A HETEROGENEOUS NETWORK

(75) Inventors: Tingfang Ji, San Diego, CA (US); Anastasios Stamoulis, San Diego, CA (US); Dexu Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 743 days.

(21) Appl. No.: 12/498,590

(22) Filed: Jul. 7, 2009

(65) Prior Publication Data

US 2010/0008295 A1 Jan. 14, 2010

Related U.S. Application Data

(60) Provisional application No. 61/080,094, filed on Jul. 11, 2008.

(51) Int. Cl.
*H04W 40/00* (2009.01)

(52) U.S. Cl. .......................................................... 370/328

(58) Field of Classification Search .................. 370/328, 370/331, 252, 350, 401, 236; 455/63.1, 67.11, 455/436, 450, 501, 422.1, 522, 524, 513
See application file for complete search history.

(56) References Cited

U.S. PATENT DOCUMENTS

| | | | |
|---|---|---|---|
| 2007/0060057 A1* | 3/2007 | Matsuo et al. | 455/63.1 |
| 2007/0082619 A1* | 4/2007 | Zhang et al. | 455/69 |
| 2007/0207828 A1* | 9/2007 | Cheng et al. | 455/522 |
| 2009/0197590 A1* | 8/2009 | Borran et al. | 455/423 |
| 2009/0197603 A1* | 8/2009 | Ji et al. | 455/436 |
| 2009/0197629 A1* | 8/2009 | Borran et al. | 455/522 |
| 2009/0264123 A1* | 10/2009 | Agashe et al. | 455/434 |
| 2009/0312024 A1* | 12/2009 | Chen et al. | 455/437 |

FOREIGN PATENT DOCUMENTS

| | | |
|---|---|---|
| EP | 1686820 A1 | 8/2006 |
| WO | WO2004032479 A2 | 4/2004 |
| WO | WO2005115042 A1 | 12/2005 |
| WO | WO2007103975 | 9/2007 |

OTHER PUBLICATIONS

International Search Report and Written Opinion—PCT/US2009/050285—ISA/EPO—Oct. 20, 2009.

* cited by examiner

*Primary Examiner* — Melody Mehrpour
(74) *Attorney, Agent, or Firm* — Nerrie M. Zohn

(57) ABSTRACT

Techniques for managing candidate sets for a user equipment (UE) are described. In an aspect, multiple candidate sets of cells of different classes may be maintained for the UE. Each candidate set may include cells of a particular class. As some examples, the multiple candidate sets may be for cells of different transmit power levels, cells of different association types, cells associated with different resources, etc. The multiple candidate sets may be maintained separately based on applicable criteria and rules. The multiple candidate sets may be used to select a serving cell for the UE and/or for other communication purposes for the UE. In another aspect, one or more candidate sets may be maintained for the UE and may be used for multiple communication purposes for the UE. The multiple communication purposes may include server selection, interference management, measurement reporting, etc.

37 Claims, 4 Drawing Sheets

CANDIDATE SET MANAGEMENT IN A HETEROGENEOUS NETWORK

The present application claims priority to provisional U.S. Application Ser. No. 61/080,094, entitled "CANDIDATE SET MANAGEMENT IN HETEROGENEOUS NETWORKS," filed Jul. 11, 2008, assigned to the assignee hereof and incorporated herein by reference.

BACKGROUND

I. Field

The present disclosure relates generally to communication, and more specifically to techniques for supporting communication by a user equipment (UE) in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of cells that can support communication for a number of UEs. A UE may be within the coverage of any number of cells at any given moment. If more than one cell is available, then it may be desirable to select the most suitable cell to serve the UE such that good performance can be achieved for the UE while improving network capacity.

SUMMARY

Techniques for managing candidate sets for a UE to facilitate communication by the UE and to possibly improve network performance are described herein. In an aspect, multiple candidate sets of cells of different classes may be maintained for the UE. Each candidate set may include cells of a particular class. As some examples, the multiple candidate sets may be for cells with different transmit power levels in a heterogeneous network, cells of different association types, cells associated with different resources to use for communication, cells with wireline backhaul and cells with wireless backhaul, etc. The multiple candidate sets may also include a candidate set of at least one "virtual" cell. Each virtual cell may comprise a group of physical cells that may jointly serve a UE. As some examples, a virtual cell may comprise a set of macro cells, a macro cell and a relay, etc. The multiple candidate sets may be maintained separately based on applicable criteria and rules. The multiple candidate sets may be used to select a serving cell for the UE and/or for other communication purposes.

In another aspect, one or more candidate sets may be maintained for the UE and may be used for multiple communication purposes for the UE. The multiple communication purposes may include server selection to select a serving cell for the UE, interference management to reduce interference from strong interfering cells at the UE, measurement reporting to send measurement reports for cells in the candidate set(s), and/or other communication purposes.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
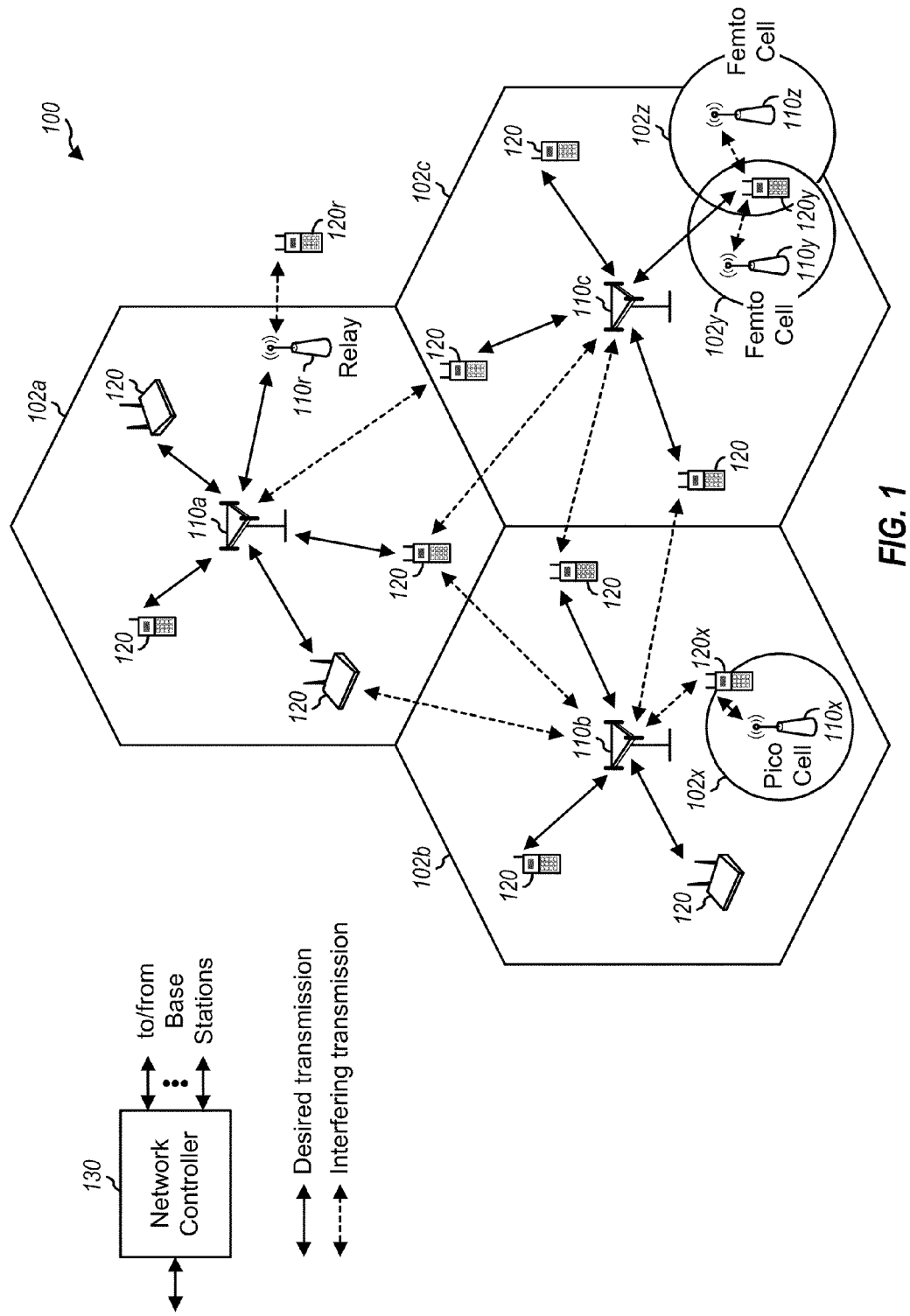
FIG. 1 shows a wireless communication network.

FIG. 1 shows a wireless communication network 100, which may include a number of base stations 110 and other network entities. A base station may be a station that communicates with the UEs and may also be referred to as a Node B, an evolved Node B (eNB), an access point, etc. Each base station may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home)

and may allow restricted access by UEs having association with the femto cell (e.g., UEs in a Closed Subscriber Group (CSG), UEs for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, base stations 110a, 110b and 110c may be macro base stations for macro cells 102a, 102b and 102c, respectively. Base station 110x may be a pico base station for a pico cell 102x. Base stations 110y and 110z may be femto base stations for femto cells 102y and 102z, respectively. A base station may support one or multiple (e.g., three) cells.

Wireless network 100 may also include relay stations. A relay station is a station that receives a transmission of data and/or other information from an upstream station (e.g., a base station or a UE) and sends a transmission of the data and/or other information to a downstream station (e.g., a UE or a base station). A relay station may also be a UE that relays transmissions for other UEs. In the example shown in FIG. 1, a relay station 110r may communicate with macro base station 110a and a UE 120r in order to facilitate communication between base station 110a and UE 120r. A relay station may also be referred to as a relay, a relay base station, etc.

Wireless network 100 may be a heterogeneous network that includes base stations of different types, e.g., macro base stations, pico base stations, femto base stations, relays, etc. These different types of base stations may have different transmit power levels, different coverage areas, and different impact on interference in wireless network 100. For example, macro base stations may have a high transmit power level (e.g., 20 Watts) whereas pico base stations, femto base stations, and relays may have a lower transmit power level (e.g., 1 Watt). Wireless network 100 may also support peer-to-peer communication between different UEs.

A network controller 130 may couple to a set of base stations and may provide coordination and control for these base stations. Network controller 130 may communicate with base stations 110 via a backhaul. Base stations 110 may also communicate with one another, e.g., directly or indirectly via wireless or wireline backhaul.

Wireless network 100 may support communication on one or more carriers. Each carrier may be defined by a particular center frequency and a particular bandwidth. Wireless network 100 may also support communication on one or more subbands on each carrier. Each subband may have a particular bandwidth, e.g., 1.25 MHz. Wireless network 100 may also support communication on multiple interlaces. Each interlace may include subframes that may be spaced apart by Q subframes, where each subframe may have a predetermined time duration and Q may be any integer value. In general, wireless network 100 may support communication on time and frequency resources that may be defined and partitioned in various manners.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro cells, pico cells, femto cells, relays, other UEs, etc. In FIG. 1, a solid line with double arrows indicates desired transmissions between a UE and a serving cell, which is a cell designated to serve the UE on the downlink and/or uplink. A dashed line with double arrows indicates interfering transmissions between a UE and a non-serving cell, which is a cell not serving the UE.

A UE may be located within the coverage of multiple cells. One of these cells may be selected to serve the UE. The process of selecting a serving cell may be referred to as server selection. The cell with the best received signal quality at the UE may be selected as the serving cell for the UE. Received signal quality may be quantified by a signal-to-noise ratio (SNR), a signal-to-noise-and-interference ratio (SINR), a carrier-to-interference ratio (C/I), etc. For clarity, SNR is used to denote received signal quality in much of the description below. Selecting the cell with the best downlink SNR as the serving cell may provide good performance in a homogenous network with only macro cells.

Server selection in a heterogeneous network with a mix of macro, pico and/or femto cells may be more challenging. For example, using the best downlink SNR as the sole metric for server selection may result in inefficiencies in the heterogeneous network. In particular, using this metric for server selection may result in pico cells having very small coverage areas due to the significantly lower transmit power of the pico cells. This may then result in the heterogeneous network having little capacity gain compared to a homogenous network with only macro cells. However, if UEs are allowed to associate with cells with weaker downlink SNR, then additional cell-splitting gain may be achieved by more efficiently reusing the spectrum among different types of cells.

In an aspect, multiple candidate sets of cells of different classes may be maintained for a UE. Each candidate set may include cells of a particular class. The different classes may be defined in various manners, as described below. The multiple candidate sets may be maintained separately based on applicable criteria and rules. The multiple candidate sets may be used for server selection and possibly other communication purposes for the UE.

Different classes of cells may be defined in various manners. In one design, the multiple candidate sets may be for cells with different transmit power levels. For example, one candidate set may include macro cells, another candidate set may include pico cells, etc. In another design, the multiple candidate sets may be for cells with different association types. For example, one candidate set may include macro and pico cells with unrestricted access, another candidate set may include femto cells with restricted access, etc. In yet another design, one candidate set may include macro cells, and another candidate set may include relays. In yet another design, the multiple candidate sets may be for cells operating on different frequencies, in different time interlaces, or on different resources defined in other manners.

In yet another design, the multiple candidate sets may be for cells supporting different radio technologies. For example, one candidate set may include cells supporting a cellular radio technology, another candidate set may include cells supporting a wireless local area network (WLAN) radio technology, etc. In yet another design, the multiple candidate sets may be for different types of entities. For example, one candidate set may include relays, another candidate set may include UEs for peer-to-peer communication, one or more candidate sets may include macro, pico and/or femto cells, etc.

In yet another design, the multiple candidate sets may include a candidate set of at least one virtual cell. In yet another design, the multiple candidate sets may be for multiple virtual cells, e.g., one candidate set of physical cells for each virtual cell. In any case, each virtual cell may comprise a group of physical cells that may jointly serve the UE. As some examples, a virtual cell may comprise a set of macro cells, a macro cell and a relay, etc.

In yet another design, the multiple candidate sets may be maintained based on criteria such as backhaul capability, etc. In yet another design, the multiple candidate sets may be for different communication purposes, e.g., handover, interference management, etc. The different classes of cells for the multiple candidate sets may also be defined in other manners.

The process of maintaining and updating a candidate set may be referred to as candidate set management. The multiple candidate sets may be updated to include cells that satisfy certain requirements, which may be quantified in various manners.

In one design, one or more parameters may be used for candidate set management. In general, a parameter may be defined for any information that may be pertinent in determining the suitability of a cell for a particular purpose. Cells may be added to or removed from the multiple candidate sets based on one or more of the following parameters:

1. Downlink SNR—may be based on historical measurements or estimates,
2. Downlink carrier-over-thermal-noise (CoT),
3. Received signal strength,
4. Quality-of-service (QoS) requirements of the UE, such as minimum rate, maximum latency, etc.,
5. Mobility of the UE—whether the UE is mobile or stationary,
6. Advertised maximum rates for downlink and uplink for a cell,
7. Admission rules or association type of a cell,
8. Power class or transmit power level of a cell,
9. Cell loading—number of UEs that a cell is serving and their throughput,
10. Loading of a serving macro cell for a relay—include UEs served directly by the macro cell as well as UEs served by the macro cell via relays,
11. Expected and measured interference-over-thermal (IoT) values of each interlace—used for uplink energy efficiency computation,
12. Resource partitioning status,
13. Channel gains between the cells and the UE, and
14. Number of antennas, antenna directivity, and antenna gain of the UE and cells.

CoT is signal over noise ratio whereas C/I is signal over interference plus noise ratio.

The advertised maximum rates for a cell may be dependent on various factors such as loading of the cell, backhaul bandwidth, etc. For example, the advertised maximum rates may be limited by the maximum rate of the backhaul for pico cells or the maximum rate of the relay link between relays and macro cells.

The admission rules or association type of a cell may impact whether the cell can be considered for the UE. For example, the cell may indicate that it is a private cell with restricted access. In this case, the cell should not be considered as a potential cell for handover if the UE is not part of the cell's private network and is unable to access the cell. However, the UE may still consider this cell for interference management and/or other purposes. A cell may also indicate its support for mobile users. For example, some pico cells may not support high-speed UEs in order to prevent frequent handovers to/from these cells.

The transmit power level or power class of a cell may affect its consideration in candidate set management in various manners. For example, resources in a heterogeneous network may be partitioned, and certain resources may be reserved for cells of a particular power class. The power class of a cell may determine whether the cell is allowed to use a particular resource.

Resource partitioning may be uniform across the wireless network or may be different for each cell. If the wireless network includes macro cells and relays, then a cell may report resource partitioning (e.g., of interlaces) for local backhaul and access links. If the wireless network includes macro and pico cells, then a cell may report resource partitioning (e.g., of interlaces) between local shared and reserved links.

Other parameters may also be used to determine whether to add cells to or remove cells from the candidate sets. In general, any set of one or more parameters may be used for candidate set management.

In one design, a set of one or more parameters may be used for management of a candidate set. A cell may be added to the candidate set if, for each parameter, the cell has a parameter value that passes an add threshold. A cell may be removed from the candidate set if, for any parameter, the cell has a parameter value that fails a drop threshold. For example, a single parameter of downlink SNR may be used for candidate set management. A cell may be added to the candidate set if its downlink SNR exceeds an add threshold and may be removed from candidate set if its downlink SNR falls below a drop threshold. The same set of parameter(s) may be used for all candidate sets. Alternatively, different sets of parameter(s) may be used for different candidate sets.

In another design, one or more metrics may be used for candidate set management. A metric may be defined based on a combination of parameters and in accordance with a function or rule. Different metrics may be defined based on different combinations of parameters or different functions of the same combination of parameters. Cells may be added to or removed from the multiple candidate sets based on one or more of the following metrics:

1. Downlink received power,
2. Downlink projected rate,
3. Uplink pathloss,
4. Uplink energy efficiency, and
5. Network utility function.

The downlink received power of a cell at the UE may be determined based on knowledge of the transmit power level of the cell, antenna gain of the cell, antenna gain of the UE, the number of antennas at the UE, the pathloss between the cell and the UE, etc. The downlink projected rate may be indicative of an estimated rate for the UE given the presence of other UEs in the cell. The downlink projected rate may be determined based on the transmit power of the cell, the number of antennas, the antenna directivity, and the antenna gain of the UE and the cell, the interlaces on which the cell can operate, the loading of the cell, etc. For a relay, the downlink projected rate may be determined based further on the loading of a serving macro cell for the relay, the capacity of the relay link between the relay and the macro cell, etc. A peak rate indicative of an estimated maximum rate for the UE may also be determined.

The uplink pathloss for a cell may be determined based on the antenna gain of the cell, and the pathloss between the cell and the UE, etc. The uplink energy efficiency may be indicative of the recommended energy to use for each bit transmitted on the uplink. The uplink energy efficiency may be determined based on the uplink pathloss, the IOT at the cell, etc. Some of the metrics may be computed as described in commonly assigned U.S. patent application Ser. No. 12/331,156, filed Dec. 9, 2008 entitled SERVING BASE STATION SELECTION IN A WIRELESS COMMUNICATION NETWORK.

Other metrics may also be defined based on the parameters listed above and/or other parameters. One or more metrics may be used to determine whether to add cells to or remove cells from the multiple candidate sets.

In general, candidate set management may be performed based on one or more criteria. A criterion may be a parameter, a metric, etc. In one design, a single criterion corresponding to a particular parameter or metric may be used for management of a candidate set. A cell may be added to the candidate set if it has a criterion value that passes an add threshold. A cell may be removed from the candidate set if it has a criterion value that fails a drop threshold. For example, a single criterion for a metric of downlink projected rate may be used. A cell may be added to the candidate set if its downlink projected rate exceeds an add threshold and may be removed from the candidate set if its downlink projected rate falls below a drop threshold.

In general, any number of criteria for any number of parameters and/or metrics may be used for each candidate set. For example, a set of criteria comprising one or more parameters (e.g., for CoT, geometry, etc.) and/or one or more metrics (e.g., for energy efficiency, projected rate, peak rate, etc.) may be used for a candidate set. The same set of criteria may be used for all candidate sets. Alternatively, different sets of criteria may be used for different candidate sets.

Figure 2:
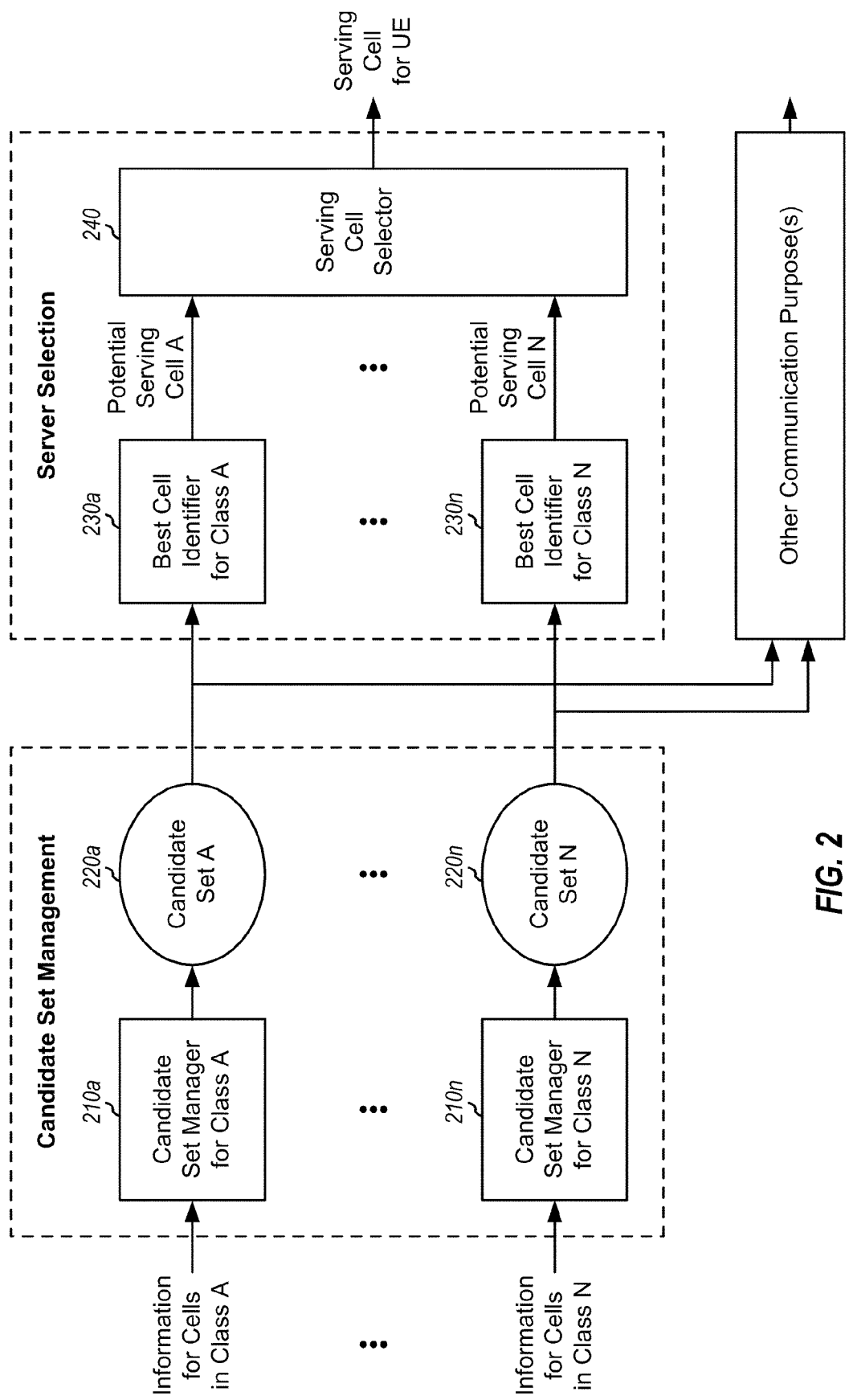
FIG. 2 shows maintenance of multiple candidate sets for a UE.

FIG. 2 shows a design of maintaining N candidate sets of cells of different classes A through N for a UE, where N may be any integer value. A candidate set manager 210a for class A may receive information for cells in class A and may determine whether to add cells to and/or remove cells from candidate set A 220a. Manager 210a may update candidate set A as information for cells in class A is received. A candidate set manager 210n for class N may receive information for cells in class N and may determine whether to add cells to and/or remove cells from candidate set N 220n. Manager 210n may update candidate set N as information for cells in class N is received. Candidate set managers for other classes may update their candidate sets in a similar manner. In one design, managers 210a through 210n may apply the same set of criteria to add and/or remove cells in the N candidate sets. In another design, managers 210a through 210n may apply different sets of criteria to add and/or remove cells in the N candidate sets.

The multiple candidate sets may be used for various communication purposes for the UE. In one design, the candidate sets may be used to select a serving cell for the UE, e.g., during initial access or handover of the UE. In general, a serving cell may be selected based on any set of one or more criteria. Some criteria may serve as constraints while other criteria may serve as optimization variables. Constraints may be used to determine whether a given cell can be considered for selection as a serving cell. A constraint may be used to ensure that a suitable cell is selected. For example, a femto cell may be selected only if it meets a constraint that the UE can access the femto cell. As another example, a cell may be selected only if it can provide the minimum QoS guarantee for QoS traffic of the UE. Optimization variables may be used to determine the most suitable cell for selection. For example, a cell with the best metric may be selected, where "best" may be dependent on how the metric is defined. The selected cell may have a lower downlink SNR than that of another cell. This server selection scheme may provide certain advantages, e.g., reduced interference in the network.

In one design, criteria used as constraints may be applied at candidate set management. Cells that do not meet the constraints may be omitted from candidate sets. Criteria used as optimization variables may be applied at server selection.

Some constraints may also be applied at server selection. For example, server selection may be based on (i) an optimization variable of the best downlink projected rate and (ii) a constraint of an uplink geometry exceeding a certain threshold and/or being within a certain range of the best uplink geometry. This constraint may ensure that an uplink control channel can be reliably sent by the UE even though the primary objective may be to maximize the downlink rate. The constraint may be determined at server selection or at candidate set management. In any case, the cell with the best value for the optimization variable may be selected as the serving cell for the UE.

In one design, different sets of criteria may be used for different candidate sets for server selection. For example, a QoS parameter of fairness may be taken into account for macro cells in one candidate set but not for pico cells in another candidate set. In another design, a criterion (e.g., a metric) may be determined in different manners for different candidate sets. For example, the downlink projected rate may be determined in different manners for macro cells and pico cells.

In the design shown in FIG. 2, server selection may be performed in two steps. In the first step, a block 230a may identify the best cell in candidate set A based on a set of one or more criteria applicable for candidate set A and may provide this cell as a potential serving cell A for the UE. A block 230n may identify the best cell in candidate set N based on a set of one or more criteria applicable for candidate set N and may provide this cell as a potential serving cell N for the UE. The best cell in each remaining candidate set may be identified in a similar manner. In the second step, a block 240 may select the best cell among all potential serving cells as the serving cell for the UE. This two-step design may simplify server selection. This two-step design may also be especially applicable when the candidate sets are maintained by different entities. An entity maintaining a particular candidate set may provide a potential serving cell from that candidate set for server selection.

In another design, server selection may be performed in a single step. Each cell in each candidate set may be evaluated based on a set of criteria applicable for that candidate set. The best cell among the cells in all candidate sets may be selected as the serving cell for the UE. Server selection may also be performed in other manners using the multiple candidate sets.

The use of multiple candidate sets may provide certain advantages. First, different candidate sets may be managed differently, which may provide flexibility. For example, a pico cell may be selected as a serving cell even if it is worse than a macro cell in terms of downlink SNR, which may improve overall network utility. The use of multiple candidate sets may also simplify server selection. The candidate sets may be updated periodically (e.g., based on relatively simple rules) to remove unsuitable or less suitable cells. When server selection is needed, the candidate sets of limited size may help speed up the server selection procedure and may reduce the amount of control information to exchange, e.g., between the UE and the current and/or new serving cell. Intelligent server selection for the UE may be facilitated by using multiple candidate sets and may be important to improve the rate and QoS of the UE while reducing interference to the wireless network.

Candidate sets are typically specific for a given UE and may be considered as attributes of the UE. Nevertheless, management of the candidate sets may be performed by the UE, by the serving cell, or by some other network entity. For example, a cell may manage the candidate sets of all UEs served by the cell.

For UE-based candidate set management, the UE may manage the candidate sets. Different cells may make measurements of the uplink for the UE. The uplink measurements and cell-related parameters may be communicated to the UE (i) by the cells sending information via over-the-air messages directly to the UE or (ii) by the cells sending information via the backhaul to the serving cell, which may then send the information via over-the-air messages to the UE. In one design, a cell may broadcast cell-related parameters that are common for all UEs and may send UE-specific information directly to the UE or indirectly to the UE via the serving cell.

For cell-based candidate set management, the candidate sets of the UE may be managed by the serving cell. The UE may make measurements of the downlink for different cells and may send a report comprising the downlink measurements to the serving cell. The serving cell may know the cells in the candidate sets of the UE and may communicate directly with these cells via the backhaul to obtain uplink measurements and/or cell-related parameters. These cells may be first tier neighbors of the serving cell.

In another aspect, one or more candidate sets may be maintained for a UE and may be used for different communication purposes for the UE. Each candidate set may be maintained based on a set of one or more criteria, as described above. In one design, multiple candidate sets may be maintained, and each candidate set may be used for a different communication purpose. In another design, a single candidate set may be maintained, and all of a subset of the candidate set may be used for each communication purpose. In general, all or a subset of one or more candidate sets may be used for each communication purpose.

In one design, one or more candidate sets may be maintained for the UE and used for one or more of the following one or more purposes:
 1. Server selection,
 2. Interference mitigation,
 3. Measurement reporting,
 4. First tier neighbor set (FTNS), and
 5. Heterogeneous association.

Server selection may be performed at initial access, for handover, and/or at other times for the UE. For initial access, the UE may enter the wireless network and may obtain the candidate set(s) of cells that can potentially serve the UE. The UE may then select a serving cell from the candidate set(s) based on one or more criteria. For handover, the UE may track the performance of each cell in the candidate set(s) as well as the serving cell. Over time, cells may be added to and/or removed from the candidate set(s) due to mobility of the UE, fading, etc. When the quality of the serving cell degrades below a certain threshold, the best cell in the candidate set(s) may be selected as a new serving cell for the UE.

For interference mitigation, the UE may measure the interference caused by each cell in the candidate set(s). When one or more cells cause excessive interference to the UE, the UE or the serving cell may perform corrective actions to mitigate the interference. In one design, the UE may generate a message with a list of cell(s) causing high interference to the UE and may send the message to the serving cell. The serving cell may determine whether the UE is in a disadvantaged location in the wireless network and may take appropriate actions to mitigate the interference. In another design, the UE may directly request the cell(s) causing high interference to reduce interference to the UE. The UE and/or the serving cell may request an interfering cell to reduce its transmit power or to avoid transmitting on the resources used by the UE.

For measurement reporting, the UE may periodically send an extended pilot report for cells in the candidate set(s). The candidate set(s) may thus determine which cells might be reported by the UE. In one design, the extended pilot report may include throughput and/or other measurements for cells in the candidate set(s) and may be sent to the serving cell. The serving cell may update the candidate sets, initiate handover, and/or perform other actions based on the extended pilot report from the UE.

For first tier neighbor set, the candidate set(s) may be used to identify first tier neighbor cells of the serving cell. For example, if two cells appear in the same candidate set of the UE, then these cells may be considered as "neighbors" in a sense that their coverage areas may overlap. The first tier neighbor set may be used for network-level optimization purposes. For example, the first tier neighbor set may be used to ensure that different cells in the set use different cell identities (IDs) to enable UEs to distinguish these cells. This may be especially applicable for femto cells, which may be deployed and/or moved in an unplanned manner.

For heterogeneous association, multiple candidate sets may be maintained for the UE, and each candidate set may be associated with different management rules. These management rules may reflect a network operator's preference for certain type of cells, e.g., as a function of the UE status. The multiple candidate sets may enable use of different performance criteria for different classes of cells. Furthermore, when resource partition occurs in a heterogeneous network, multiple candidate sets may be maintained for different resource partitions, e.g., different carriers, different interlaces, etc.

One or more candidate sets may be maintained and used for different communication purposes in various manners. In one design, at least one candidate set may be used for server selection, another candidate set may be used for interference management, etc. In another design, at least one candidate set may be used for server selection, all or a subset of the at least one candidate set may be used for interference management, etc. In general, all or a subset of one or more candidate sets may be used for a given communication purpose. Furthermore, a given candidate set may be used, in full or in part, for one or more communication purposes.

Figure 3:
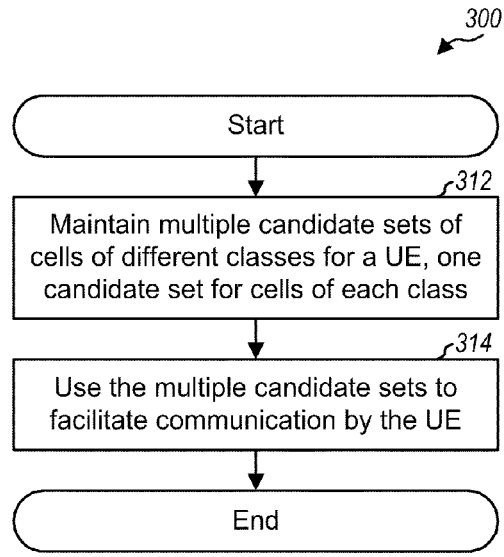
FIGS. 3 and 4 show a process and an apparatus, respectively, for maintaining and using multiple candidate sets for a UE.

FIG. 3 shows a design of a process 300 for using multiple candidate sets. Process 300 may be performed by a UE, a base station for a serving cell for the UE, or some other entity. Multiple candidate sets of cells of different classes may be maintained for the UE, one candidate set for cells of each class (block 312). In one design, each class may be associated with a particular transmit power level, and the cells of different classes may have different transmit power levels. For example, one candidate set may be maintained for cells with a high transmit power level, and another candidate set may be maintained for cells with a lower transmit power level. In another design, each class may be associated with a particular association type, and the cells of different classes may have different association types. For example, one candidate set may be maintained for cells with unrestricted access, and another candidate set may be maintained for cells with restricted access. In another design, each class may be associated with a particular set of resources to use for communication, and the cells of different classes may be associated with different resources to use for communication. For example, one candidate set may be maintained for cells operating on a particular carrier or interlace, and another candidate set may be maintained for cells operating on another carrier or interlace. The different classes of cells may also be defined in other manners, as described above.

In one design of block 312, each candidate set may be updated based on a set of at least one criterion applicable for that candidate set. The same set of at least one criterion may be applicable for the multiple candidate sets. Alternatively, different sets of at least one criterion may be applicable for the multiple candidate sets.

In one design, the multiple candidate sets may be maintained by the UE. The UE may receive measurements from different cells and may update the multiple candidate sets based on the received measurements. In another design, the multiple candidate sets may be maintained by the serving cell for the UE. The serving cell may receive measurements for different cells from the UE and may update the multiple candidate sets based on the received measurements. The candidate sets may also be updated by other entities.

The multiple candidate sets may be used to facilitate communication by the UE (block 314). In one design, the multiple candidate sets may be used for server selection. The serving cell for the UE may be selected from among the cells in the multiple candidate sets. The serving cell may be selected by evaluating the cells in each candidate set based on a set of at least one criterion applicable for the candidate set. The same or different sets of at least one criterion may be applicable for the multiple candidate sets for server selection. For a two-step design, potential serving cells for the UE may be identified from the multiple candidate sets, one potential serving cell from each candidate set. One of the potential serving cells may be selected as the serving cell for the UE. For a one-step design, the serving cell may be selected by evaluating all cells in the multiple candidate sets and selecting the best cell. The multiple candidate sets may also be used for other communication purposes, as described above.

Figure 4:
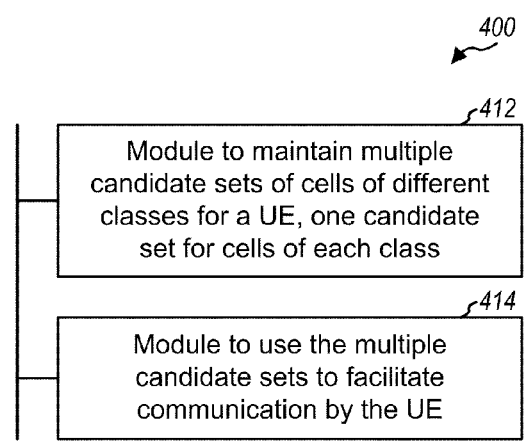

FIG. 4 shows a design of an apparatus 400 for using multiple candidate sets. Apparatus 400 includes a module 412 to maintain multiple candidate sets of cells of different classes for a UE, one candidate set for cells of each class, and a module 414 to use the multiple candidate sets to facilitate communication by the UE.

Figure 5:
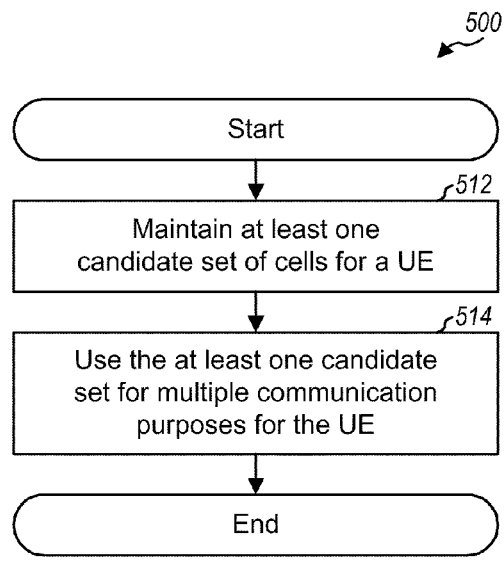
FIGS. 5 and 6 show a process and an apparatus, respectively, for using one or more candidate sets for different communication purposes for a UE.

FIG. 5 shows a design of a process 500 for using one or more candidate sets for different communication purposes. Process 500 may be performed by a UE, a base station for a serving cell of the UE, or some other entity. At least one candidate set of cells may be maintained for the UE (block 512). The at least one candidate set may be used for multiple communication purposes for the UE (block 514).

In one design, the multiple communication purposes may include server selection. The serving cell may be selected for the UE from among the cells in the at least one candidate set. In another design, the multiple communication purposes may include interference management for the UE. One or more cells causing high interference to the UE may be identified from among the cells in the at least one candidate set. Reduction of interference from the interfering cell(s) may then be initiated. For example, the UE may send a message to the serving cell or to an interfering cell to request for reduced interference to the UE. The serving cell may also send a message to an interfering cell to request for reduced interference to the UE. In yet another design, the multiple communication purposes may include measurement reporting by the UE. The UE may send a measurement report comprising measurements for cells in the at least one candidate set. The multiple communication purposes may also include other functions, as described above.

Figure 6:
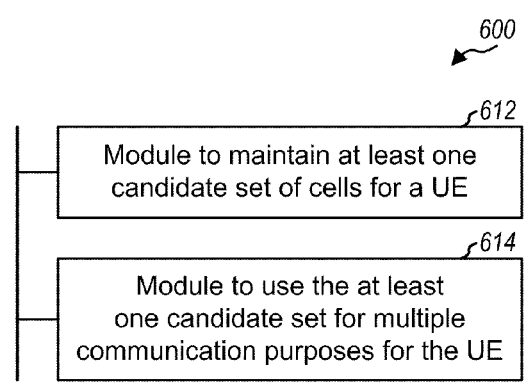

FIG. 6 shows a design of an apparatus 600 for using one or more candidate sets for different communication purposes. Apparatus 600 includes a module 612 to maintain at least one candidate set of cells for a UE, and a module 614 to use the at least one candidate set for multiple communication purposes for the UE.

The modules in FIGS. 4 and 6 may comprise processors, electronics devices, hardware devices, electronics components, logical circuits, memories, software codes, firmware codes, etc., or any combination thereof.

Figure 7:
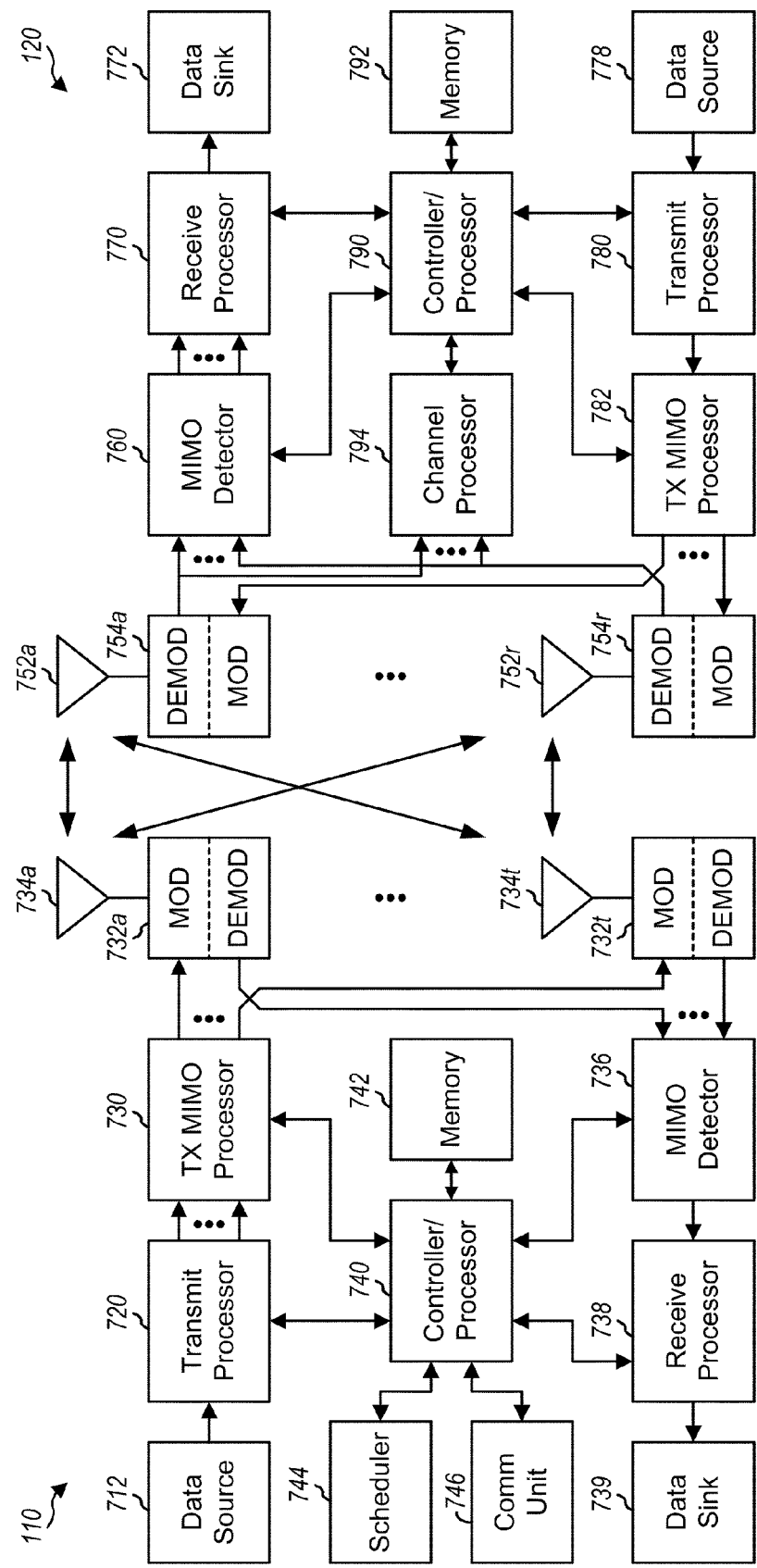
FIG. 7 shows a block diagram of a base station and a UE.

FIG. 7 shows a block diagram of a design of a base station 110 and a UE 120, which may be one of the base stations and one of the UEs in FIG. 1. Base station 110 may be equipped with T antennas 734a through 734t, and UE 120 may be equipped with R antennas 752a through 752r, where in general T≧1 and R≧1. Base station 110 may serve one or more cells.

At base station 110, a transmit processor 720 may receive data for one or more UEs from a data source 712, process (e.g., encode and modulate) the data for each UE based on one or more modulation and coding schemes, and provide data symbols for all UEs. Transmit processor 720 may also receive control information (e.g., information for candidate set management, server selection, interference management, etc.) from a controller/processor 740, process the control information, and provide control symbols. A transmit (TX) multiple-input multiple-output (MIMO) processor 730 may perform spatial processing (e.g., preceding) on the data symbols, the control symbols, and/or pilot symbols, if applicable, and may provide T output symbol streams to T modulators (MOD) 732a through 732t. Each modulator 732 may process a respective output symbol stream (e.g., for OFDM, CDMA, etc.) to obtain an output sample stream. Each modulator 732 may further process (e.g., convert to analog, amplify, filter, and upconvert) the output sample stream to obtain a downlink signal. T downlink signals from modulators 732a through 732t may be transmitted via T antennas 734a through 734t, respectively.

At UE 120, R antennas 752a through 752r may receive the downlink signals from base station 110 and other base stations and may provide received signals to demodulators (DEMOD) 754a through 754r, respectively. Each demodulator 754 may condition (e.g., filter, amplify, downconvert, and digitize) a respective received signal to obtain received samples and may further process the received samples (e.g., for OFDM, CDMA, etc.) to obtain received symbols. A MIMO detector 760 may perform MIMO detection on the received symbols from all R demodulators 754a through 754r, if applicable, and may provide detected symbols. A receive processor 770 may process (e.g., demodulate and decode) the detected symbols, provide decoded data for UE 120 to a data sink 772, and provide decoded control information to a controller/processor 790. A channel processor 794 may make measurements for cells, which may be used for candidate set management, server selection, interference management, etc.

On the uplink, at UE 120, data from a data source 778 and control information (e.g., information for candidate set management, server selection, interference management, etc.) from controller/processor 790 may be processed by a transmit processor 780, precoded by a TX MIMO processor 782 (if applicable), conditioned by modulators 754a through 754r, and transmitted via antennas 752a through 752r. At base station 110, the uplink signals from UE 120 and other UEs may be received by antennas 734, conditioned by demodulators 732, detected by a MIMO detector 736, and processed by a receive processor 738 to obtain the data and control information transmitted by UE 120 and other UEs.

Controllers/processors 740 and 790 may direct the operation at base station 110 and UE 120, respectively. Processor 740 and/or other processors and modules at base station 110 may perform or direct process 300 in FIG. 3, process 500 in FIG. 5, and/or other processes for the techniques described herein. Processor 790 and/or other processors and modules at UE 120 may also perform or direct process 300 in FIG. 3, process 500 in FIG. 5, and/or other processes for the techniques described herein. Memories 742 and 792 may store data and program codes for base station 110 and UE 120, respectively. A scheduler 744 may schedule UEs for transmissions on the downlink and/or uplink and may assign resources to the scheduled UEs. A communication (Comm) unit 746 may support communication with other base stations and network controller 130 via the backhaul.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   maintaining multiple candidate sets of cells of different classes for a user equipment (UE), one candidate set for cells of each class; and
   using the multiple candidate sets to facilitate communication by the UE,
   wherein each class is associated with a particular set of resources to use for communication, and wherein the cells of different classes are associated with different resources to use for communication.

2. The method of claim 1, wherein each class is associated with a particular transmit power level, and wherein the cells of different classes have different transmit power levels.

3. The method of claim 1, wherein each class is associated with a particular association type, and wherein the cells of different classes have different association types.

4. The method of claim 1, wherein the multiple candidate sets comprise a first candidate set of at least one macro cell and a second candidate set of at least one relay.

5. The method of claim 1, wherein the multiple candidate sets comprise a candidate set of at least one virtual cell, each virtual cell comprising multiple physical cells that can jointly serve the UE.

6. The method of claim 1, wherein the maintaining the multiple candidate sets comprises updating each candidate set based on a set of at least one criterion applicable for the candidate set, and wherein different sets of at least one criterion are applicable for the multiple candidate sets.

7. The method of claim 1, wherein the using the multiple candidate sets comprises selecting a serving cell for the UE from among the cells in the multiple candidate sets.

8. The method of claim 7, wherein the selecting the serving cell for the UE comprises selecting the serving cell by evaluating the cells in each candidate set based on a set of at least one criterion applicable for the candidate set, and wherein different sets of at least one criterion are applicable for the multiple candidate sets.

9. The method of claim 7, wherein the selecting the serving cell for the UE comprises
    identifying potential serving cells for the UE from the multiple candidate sets, one potential serving cell from each candidate set, and
    selecting one of the potential serving cells as the serving cell for the UE.

10. The method of claim 1, wherein the multiple candidate sets comprise first and second candidate sets, and wherein the using the multiple candidate sets comprises
    using the first candidate set for a first communication purpose for the UE, and
    using the second candidate set for a second communication purpose for the UE.

11. The method of claim 10, wherein the first communication purpose relates to server selection, and wherein the second communication purpose relates to measurement reporting, interference management, determination of first tier neighbor set, or association in a heterogeneous network.

12. The method of claim 1, wherein the multiple candidate sets are maintained by the UE.

13. The method of claim 12, wherein the maintaining the multiple candidate sets comprises
    receiving measurements for the UE from cells, and
    updating the multiple candidate sets based on the measurements received from the cells.

14. The method of claim 1, wherein the multiple candidate sets are maintained by a serving cell for the UE.

15. The method of claim 14, wherein the maintaining the multiple candidate sets comprises
    receiving measurements for cells from the UE, and
    updating the multiple candidate sets based on the measurements received from the UE.

16. An apparatus for wireless communication, comprising:
    means for maintaining multiple candidate sets of cells of different classes for a user equipment (UE), one candidate set for cells of each class; and
    means for using the multiple candidate sets to facilitate communication by the UE,
    wherein each class is associated with a particular set of resources to use for communication, and wherein the cells of different classes are associated with different resources to use for communication.

17. The apparatus of claim 16, wherein each class is associated with a particular transmit power level, and wherein the cells of different classes have different transmit power levels.

18. The apparatus of claim 16, wherein the means for maintaining the multiple candidate sets comprises means for updating each candidate set based on a set of at least one criterion applicable for the candidate set, and wherein different sets of at least one criterion are applicable for the multiple candidate sets.

19. The apparatus of claim 16, wherein the means for using the multiple candidate sets comprises means for selecting a serving cell for the UE from among the cells in the multiple candidate sets.

20. The apparatus of claim 19, wherein the means for selecting the serving cell for the UE comprises means for selecting the serving cell by evaluating the cells in each candidate set based on a set of at least one criterion applicable for the candidate set, and wherein different sets of at least one criterion are applicable for the multiple candidate sets.

21. An apparatus for wireless communication, comprising:
    at least one processor configured to maintain multiple candidate sets of cells of different classes for a user equipment (UE), one candidate set for cells of each class, and to use the multiple candidate sets to facilitate communication by the UE;
    wherein each class is associated with a particular set of resources to use for communication, and wherein the cells of different classes are associated with different resources to use for communication.

22. The apparatus of claim 21, wherein each class is associated with a particular transmit power level, and wherein the cells of different classes have different transmit power levels.

23. The apparatus of claim 21, wherein the at least one processor is configured to update each candidate set based on a set of at least one criterion applicable for the candidate set, and to use different sets of at least one criterion for the multiple candidate sets.

24. The apparatus of claim 21, wherein the at least one processor is configured to select a serving cell for the UE from among the cells in the multiple candidate sets.

25. The apparatus of claim 24, wherein the at least one processor is configured to select the serving cell by evaluating the cells in each candidate set based on a set of at least one criterion applicable for the candidate set, and to use different sets of at least one criterion for the multiple candidate sets.

26. A computer program product, comprising:
    a non-transitory computer-readable medium comprising:
        code for causing at least one computer to maintain multiple candidate sets of cells of different classes for a user equipment (UE), one candidate set for cells of each class, and
        code for causing the at least one computer to use the multiple candidate sets to facilitate communication by the UE,
    wherein each class is associated with a particular set of resources to use for communication, and wherein the cells of different classes are associated with different resources to use for communication.

27. A method for wireless communication, comprising:
    maintaining at least one candidate set of cells for a user equipment (UE), one candidate set for cells of each class; and
    using the at least one candidate set for multiple communication purposes for the UE,
    wherein each class is associated with a particular set of resources to use for communication, and wherein the cells of different classes are associated with different resources to use for communication.

28. The method of claim 27, wherein the multiple communication purposes include server selection, and wherein the using the at least one candidate set comprises selecting a serving cell for the UE from among the cells in the at least one candidate set.

29. The method of claim 27, wherein the multiple communication purposes include interference management for the UE, and wherein the using the at least one candidate set comprises
    identifying cells causing high interference to the UE from among the cells in the at least one candidate set, and initiating reduction of interference from the cells causing high interference to the UE.

30. The method of claim 27, wherein the multiple communication purposes include measurement reporting by the UE, and wherein the using the at least one candidate set comprises sending a measurement report comprising measurements for cells in the at least one candidate set.

31. An apparatus for wireless communication, comprising:
means for maintaining at least one candidate set of cells for a user equipment (UE), one candidate set for cells of each class; and
means for using the at least one candidate set for multiple communication purposes for the UE,
wherein each class is associated with a particular set of resources to use for communication, and wherein the cells of different classes are associated with different resources to use for communication.

32. The apparatus of claim 31, wherein the multiple communication purposes include server selection, and wherein the means for using the at least one candidate set comprises means for selecting a serving cell for the UE from among the cells in the at least one candidate set.

33. The apparatus of claim 31, wherein the multiple communication purposes include interference management for the UE, and wherein the means for using the at least one candidate set comprises
means for identifying cells causing high interference to the UE from among the cells in the at least one candidate set, and
means for initiating reduction of interference from the cells causing high interference to the UE.

34. The apparatus of claim 31, wherein the multiple communication purposes include measurement reporting by the UE, and wherein the means for using the at least one candidate set comprises means for sending a measurement report comprising measurements for cells in the at least one candidate set.

35. An apparatus for wireless communication, comprising:
logic, comprising hardware, configured to:
maintain multiple candidate sets of cells of different classes for a UE, one candidate set for cells of each class; and
use the multiple candidate sets to facilitate communication by the UE;
wherein each class is associated with a particular set of resources to use for communication, and wherein the cells of different classes are associated with different resources to use for communication.

36. A computer program product, comprising:
a non-transitory computer-readable medium comprising code for:
maintaining at least one candidate set of cells for a user equipment (UE), one candidate set for cells of each class; and
using the at least one candidate set for multiple communication purposes for the UE,
wherein each class is associated with a particular set of resources to use for communication, and wherein the cells of different classes are associated with different resources to use for communication.

37. The method of claim 1, wherein each class is designed to satisfy certain minimum performance thresholds such that the minimum performance thresholds are based on a particular network optimization metric.

\* \* \* \* \*